(12) United States Patent
Tong

(10) Patent No.: US 12,199,330 B2
(45) Date of Patent: Jan. 14, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventor: Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 119 days.

(21) Appl. No.: 18/000,792

(22) PCT Filed: Jun. 7, 2021

(86) PCT No.: PCT/JP2021/021644
§ 371 (c)(1),
(2) Date: Dec. 5, 2022

(87) PCT Pub. No.: WO2021/261233
PCT Pub. Date: Dec. 30, 2021

(65) Prior Publication Data
US 2023/0208008 A1 Jun. 29, 2023

(30) Foreign Application Priority Data

Jun. 23, 2020 (JP) .................................. 2020-108048

(51) Int. Cl.
*H01Q 1/12* (2006.01)
*H01Q 1/24* (2006.01)

(52) U.S. Cl.
CPC .......... *H01Q 1/1257* (2013.01); *H01Q 1/243* (2013.01)

(58) Field of Classification Search
CPC ..... H01Q 1/1257; H01Q 1/243; H01Q 3/2629
See application file for complete search history.

(56) References Cited

U.S. PATENT DOCUMENTS

| 6,509,865 B2 | 1/2003 | Takaï |
| 8,412,106 B2 | 4/2013 | da Silva et al. |
| 2006/0232483 A1* | 10/2006 | Iwai ..................... H04B 7/0845 343/702 |

(Continued)

FOREIGN PATENT DOCUMENTS

| JP | 2001-044739 A | 2/2001 |
| JP | 2001-223516 A | 8/2001 |

(Continued)

OTHER PUBLICATIONS

Cheol-Ung Lee et al. "Phased Array Antenna Calibration Technique Based on Center-Null-Tracking (CNT) Method" Proceedings of the 16th European Radar Conference, Oct. 2-4, 2019, pp. 461-464, Paris, France.

(Continued)

*Primary Examiner* — Hoang V Nguyen
(74) *Attorney, Agent, or Firm* — Studebaker & Brackett PC

(57) ABSTRACT

An electronic device includes an array antenna and a controller. The array antenna includes a plurality of antenna elements. The controller is configured to exercise control to transmit and/or receive a radio wave through the array antenna. The controller controls directivity of the array antenna and compensates at least partially for reception sensitivity at a null point in the directivity of the array antenna by using a predetermined antenna element of the array antenna.

15 Claims, 9 Drawing Sheets

(56) References Cited

U.S. PATENT DOCUMENTS

2012/0064841 A1   3/2012   Husted et al.

FOREIGN PATENT DOCUMENTS

| JP | 2013-543295 A | 11/2013 |
|---|---|---|
| WO | 01/67547 A2 | 9/2001 |

OTHER PUBLICATIONS

Younggun Ji et al., "Intelligent Beamforming for Personal Area Network Systems", Knowledge-Based Intelligent Information and Engineering Systems, KES 2006, Part III, Lecture Notes in Computer Science, LNAI 4253, Springer, Berlin, pp. 473-479, Jan. 1, 2006.

Arora D. et al., "Beamforming technique to solve the hidden beam problem in wireless communication systems", IET Communications, vol. 3, No. 11, pp. 1747-1756, Nov. 9, 2009.

\* cited by examiner

ELECTRONIC DEVICE, METHOD FOR CONTROLLING ELECTRONIC DEVICE, AND PROGRAM

CROSS-REFERENCE TO RELATED APPLICATIONS

The present application claims priority to Japanese Patent Application No. 2020-108048, filed on Jun. 23, 2020, the content of which is incorporated by reference herein in its entirety.

TECHNICAL FIELD

The present disclosure relates to an electronic device, a method for controlling an electronic device, and a program.

BACKGROUND OF INVENTION

A technique known in the field of radio communications and developed to control the directivity of antennas adopts the approach of electrically controlling the amplitude and phase of radio waves emitted by antenna elements (radiating elements) that are systematically arranged to constitute an array antenna. A technique developed to improve the quality of radio communications by using such an array antenna is known as Adaptive Array. The weights assigned to antenna elements of an array antenna may be controlled in an adaptive manner with reference to the propagation environment such that the directivity of the array antenna can be changed electrically. Such an antenna is known as an adaptive array antenna (AAA).

Examples of the techniques into which array antennas are adopted include those proposed in Patent Literatures 1 and 2. A receiver disclosed in Patent Literature 1 employs Adoptive Array to reduce the effect of a delayed wave or an interference wave when receiving an output signal. An approach proposed in Patent Literature 2 involves execution of both beam steering control and null steering control.

CITATION LIST

Patent Literature

Patent Literature 1: Japanese Unexamined Patent Application Publication No. 2001-44739
Patent Literature 2: Japanese Unexamined Patent Application Publication No. 2001-223516

SUMMARY

In an embodiment of the present disclosure, an electronic device includes an array antenna and a controller. The array antenna includes a plurality of antenna elements. The controller is configured to exercise control to transmit and/or receive a radio wave through the array antenna. The controller controls directivity of the array antenna and compensates at least partially for reception sensitivity at a null point in the directivity of the array antenna by using a predetermined antenna element of the array antenna.

In another embodiment, a method is to be employed to control an electronic device including an array antenna. The array antenna includes a plurality of antenna elements. The method includes: exercising control to transmit and/or receive a radio wave through the array antenna; and controlling directivity of the array antenna and compensating at least partially for reception sensitivity at a null point in the directivity of the array antenna by using a predetermined antenna element of the array antenna.

In still another embodiment, a program is to be executed by a computer configured to control an electronic device including an antenna array. The antenna array includes a plurality of antenna elements. The program causes the computer to exercise control to transmit and/or receive a radio wave through the array antenna. The program also causes the computer to control directivity of the array antenna and to compensate at least partially for reception sensitivity at a null point in the directivity of the array antenna by using a predetermined antenna element of the array antenna.

DESCRIPTION OF EMBODIMENTS

Figure 1:
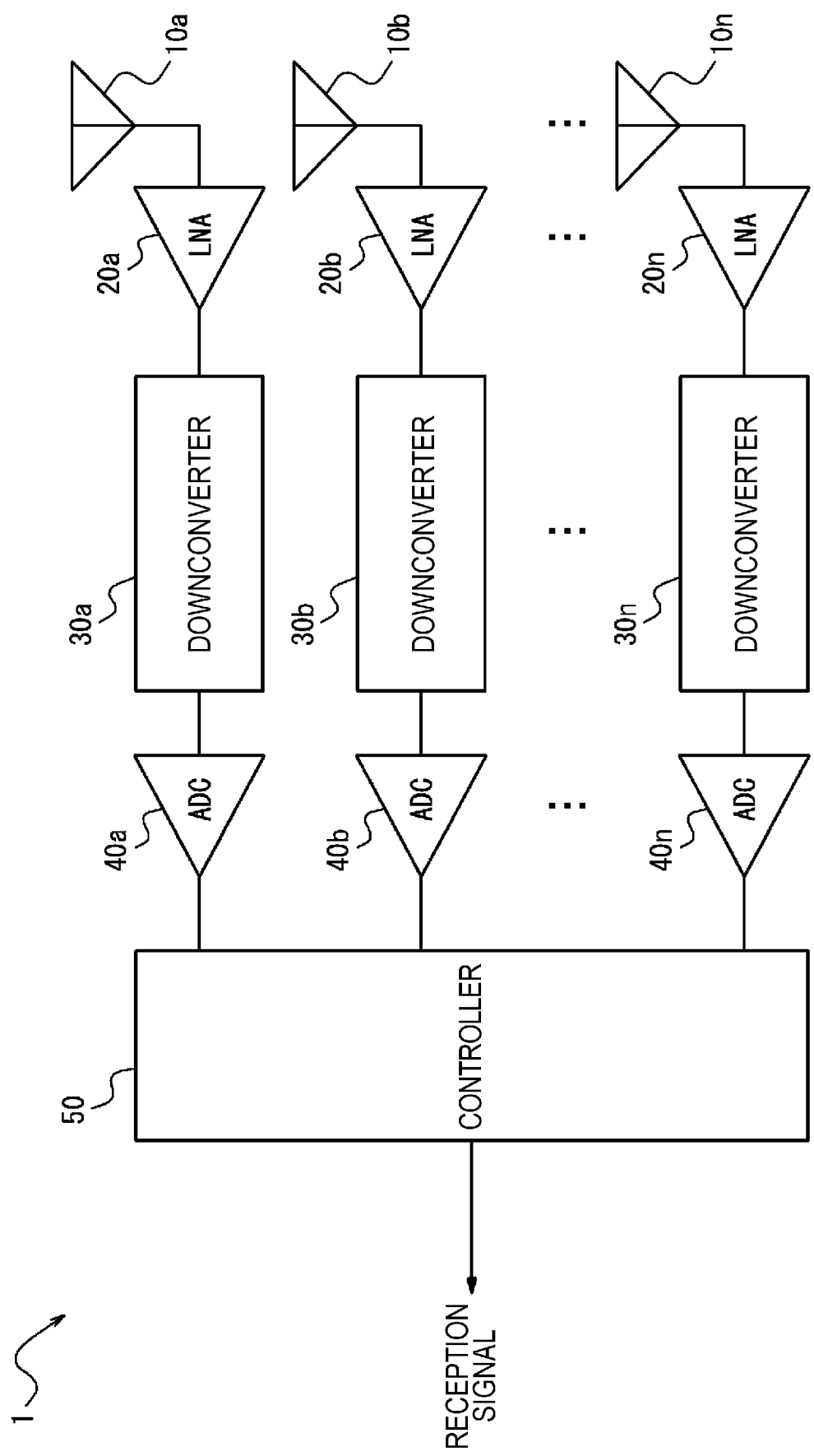
FIG. 1 is a functional block diagram schematically illustrating the configuration of an electronic device according to an embodiment.

Using an adaptive array antenna to perform beamforming results in the occurrence of null in the directivity, in which case shadow regions are formed in the directions of null points at the time of reception of radio waves. As a workaround, the adaptive array antenna may be configured to reduce shadow regions (null points) at the time of reception of radio waves. The utility of the adaptive array antenna can be increased accordingly. The present disclosure provides an electronic device, a method for controlling an electronic device, and a program that are conducive to increasing the utility of an adaptive array antenna. An embodiment of the present disclosure provides an electronic device, a method for controlling an electronic device, and a program that are conducive to increasing the utility of an adaptive array antenna. Hereinafter, an embodiment will be described in detail with reference to the accompanying drawings.

An electronic device according to an embodiment may be a receiver configured to receive radio waves transmitted from a transmitter. For example, an electronic device according to an embodiment is a receiver included in a component of a system known as Vehicle-to-Infrastructure (V2I). Example of the component include a roadside unit installed beside a roadway. The roadside unit may be configured to transmit information to vehicles traveling nearby the roadside unit or to receive information from vehicles traveling nearby the roadside unit. It is not required that the electronic device according to an embodiment be a receiver included in such a roadside unit or the like. The electronic device may be included in various kinds of apparatuses or may operate in cooperation with various kinds of apparatuses. As will be mentioned later, the electronic device according to an embodiment may be a transmitter configured to transmit radio waves or a transceiver configured to transmit radio waves and to receive radio waves. In an embodiment that will be described below, the electronic device is a receiver included in a roadside unit or the like or is a receiver configured to operate in cooperation with a roadside unit or the like. The electronic device according to an embodiment may be configured to receive a radio wave transmitted from, for example, a transmitter mounted on a vehicle traveling nearby a roadside unit or the like.

First Embodiment

The adaptive array antenna mentioned above is adopted into a known technique that enables beamforming. Beamforming enhances the directivity of an antenna (concentrates radiation) in a given direction to enable transmission or reception of radio waves in a localized manner. This provides added communication performance. Such a technique involves control of weights assigned to antenna elements of the adaptive array antenna (beamforming and/or null steering). The weights assigned to the individual antenna elements is controlled (in an adaptive manner) with reference to the propagation environment such that the array antenna has desired directivity. Various techniques have been proposed in this technical field with emphasis laid on increasing the directivity. For example, Patent Literature 1 and Patent Literature 2 describe that the weights assigned to antennas are controlled by using algorithms to eliminate or reduce array directivity variance with respect to a communication target in a desired location, with a view to overcoming unfavorable situations.

Whereas beamforming is a technique for enabling transmission and/or reception of radio waves in a localized manner, the following is an example of techniques for enabling transmission and/or reception of radio waves within a predetermined coverage area. Broadcast enables transmission of radio waves in a wide area. Such a communications technique for transmitting and/or receiving radio waves in a wide area seemingly conflicts with the techniques concerning Adaptive Array.

For example, techniques concerning an intelligent transport system (ITS) that supports automated driving, safe driving, or the like is employed in the roadside unit, which can thus enable people, vehicles, and roads (infrastructures) to exchange information with each other. The roadside unit is conceivably designed for transmission and reception in every direction. Communications of this kind are seemingly incompatible with Adaptive Array. In some cases, however, the roadside unit is to communicate with, for example, an emergency vehicle. To that end, the roadside unit is preferably designed for adaptive beam radiation so as to radiate beams in a particular direction (e.g., toward the emergency vehicle) while being capable of transmitting and receiving radio waves in every direction.

To address such a need, an electronic device 1 according to an embodiment performs beamforming by using an adaptive array antenna and reduces shadow regions (null points) at the time of reception of radio waves. The following describes the configuration that enables the electronic device 1 to perform communications in this manner.

FIG. 1 is a functional block diagram schematically illustrating the configuration of an electronic device according to an embodiment. As stated above, the electronic device according to an embodiment may be a receiver configured to receive radio waves transmitted from a transmitter or the like.

Referring to FIG. 1, the electronic device 1 according to an embodiment may include receiving antennas, which are denoted by 10a, 10b, . . . , and 10n. The receiving antenna 10a, the receiving antenna 10b, . . . , and the receiving antenna 10n are also herein simply referred to as receiving antennas 10 when there is no need to distinguish one from another. The receiving antennas 10 receive radio waves transmitted from a predetermined transmitter (transmitter device) or the like. FIG. 1 schematically illustrates the electronic device 1 including the receiving antennas 10a to 10n, where n is the total number of receiving antennas 10. The electronic device 1 according to an embodiment may include two or more receiving antennas 10. The number of receiving antennas 10 is not limited to particular values. The receiving antennas 10 included in the electronic device 1 illustrated in FIG. 1 may be nondirectional antennas. That is, the receiving antennas 10 constituting an array antenna of the electronic device 1 according to an embodiment may be nondirectional.

The electronic device 1 illustrated in FIG. 1 includes an array antenna including the receiving antennas 10. In other words, the receiving antennas 10 of the electronic device 1 may be arranged systematically. For example, the receiving antennas 10 of the electronic device 1 may be arranged linearly with equal spaces. That is, the electronic device 1 according to an embodiment includes an array antenna including antenna elements. The receiving antennas 10 of the electronic device 1 may constitute an adaptive array antenna. In other words, the receiving antennas 10 of the electronic device 1 serve as an adaptive array antenna.

Referring to FIG. 1, the electronic device 1 may include low noise amplifiers (LNAs), which are denoted by 20a, 20b, . . . , and 20n. The LNA 20a, the LNA 20b, . . . , and the LNA 20n are also herein simply referred to as LNAs 20 when there is no need to distinguish one from another. As illustrated in FIG. 1, each of the LNAs 20 is connected to the corresponding one of the receiving antennas 10. Radio waves (signals) received through the receiving antennas 10 are amplified with a low noise level by the LNAs 20. Each of the LNAs 20 amplifies a radio wave received through the corresponding one of the receiving antennas 10 connected to the respective LNAs 20. FIG. 1 schematically illustrates the electronic device 1 including the LNAs 20a to 20n, where n is the total number of LNAs 20. The electronic device 1 according to an embodiment may include two or more LNAs 20. The number of LNAs 20 is not limited to particular values. For example, the LNAs 20 included in the electronic device 1 according to an embodiment may be equal in number to the receiving antennas 10.

Referring to FIG. 1, the electronic device 1 may include downconverters, which are denoted by 30a, 30b, . . . , and 30n. The downconverter 30a, the downconverter 30b, . . . , and the downconverter 30n are also herein simply referred to as downconverters 30 when there is no need to distinguish one from another. As illustrated in FIG. 1, each of the downconverters 30 may be connected to the corresponding one of the LNAs 20. Upon receipt of radio waves (signals) from the LNAs 20, the downconverters 30 convert the radio waves into signals of low frequency. That is, each of the downconverters 30 receives a radio wave from the corresponding one of the LNAs 20 connected to the respective downconverters 30 and then converts the radio wave to a lower frequency. FIG. 1 schematically illustrates the electronic device 1 including the downconverters 30a to 30n, where n is the total number of downconverters 30. The electronic device 1 according to an embodiment may include two or more downconverters 30. The number of downconverters 30 is not limited to particular values. For example, the downconverters 30 included in the electronic device 1 according to an embodiment may be equal in number to the receiving antennas 10.

Referring to FIG. 1, the electronic device 1 may include analog-to-digital converters (ADCs), which are denoted by 40a, 40b, . . . , and 40n. The ADC 40a, the ADC 40b, . . . , and the ADC 40n are also herein simply referred to as ADCs 40 when there is no need to distinguish one from another. As illustrated in FIG. 1, each of the ADCs 40 may be connected to the corresponding one of the downconverters 30. Upon receipt of analog signals from the downconverters 30, the ADCs 40 convert the analog signals into digital signals. That is, each of the ADCs 40 receives a frequency-converted analog signal from the corresponding one of the downconverters 30 connected to the respective ADCs 40 and then converts the analog signal into a digital signal. FIG. 1 schematically illustrates the electronic device 1 including the ADCs 40a to 40n, where n is the total number of ADCs 40. The electronic device 1 according to an embodiment may include two or more ADCs 40. The number of ADCs 40 is not limited to particular values. For example, the ADCs 40 included in the electronic device 1 according to an embodiment may be equal in number to the receiving antennas 10.

The receiving antennas 10, the LNAs 20, the downconverters 30, and the ADCs 40 may be engineered with the use of known techniques. Thus, the receiving antennas 10, the LNAs 20, the downconverters 30, and the ADCs 40 will not be further elaborated here.

Referring to FIG. 1, the electronic device 1 may include a controller 50. As illustrated in FIG. 1, the controller 50 may be connected to the ADCs 40. The controller 50 performs predetermined digital signal processing on digital signals received from the ADCs 40. That is, the controller 50 processes digital signals converted from analog signals by the ADCs 40.

The controller 50 is capable of controlling not only the operation of the individual functional units of the electronic device 1 but also the overall operation of the electronic device 1. The controller 50 may include at least one processor to provide control and processing capacity for performing various functions. Examples of the processor include a central processing unit (CPU) and a digital signal processor (DSP). The functions of the controller 50 may be performed by one processor, by several processors, or by the respective processors. Such a processor may be implemented as a single integrated circuit (IC). Alternatively, the processor may be implemented as ICs that are communicably connected to each other. Still alternatively, the processor may be implemented as a discrete circuit. The processor may be engineered with the use of various other known techniques. The controller 50 in an embodiment may be configured as a CPU or as a program executed by the CPU. The controller 50 may include memory for the operation of the controller 50 where appropriate.

As illustrated in FIG. 1, reception signals may be provided to another functional unit and/or another device after undergoing the digital signal processing performed by the controller 50. The controller 50 may exercise control to transmit and/or receive radio waves through an array antenna including antenna elements (e.g., the receiving antennas 10). The control exercised by a predetermined controller to transmit and/or receive radio waves may be engineered with the use of known techniques. Thus, the control exercised by the controller 50 to transmit and/receive radio waves will not be further elaborated here.

The operation by which the electronic device 1 according to an embodiment receives radio waves will be described below in more detail.

As stated above, the receiving antennas 10 of the electronic device 1 illustrated in FIG. 1 serve as an adaptive array antenna. Using such an adaptive array antenna to perform beamforming results in the occurrence of null in the directivity, in which case shadow regions are formed in the directions of null points.

Figure 2:
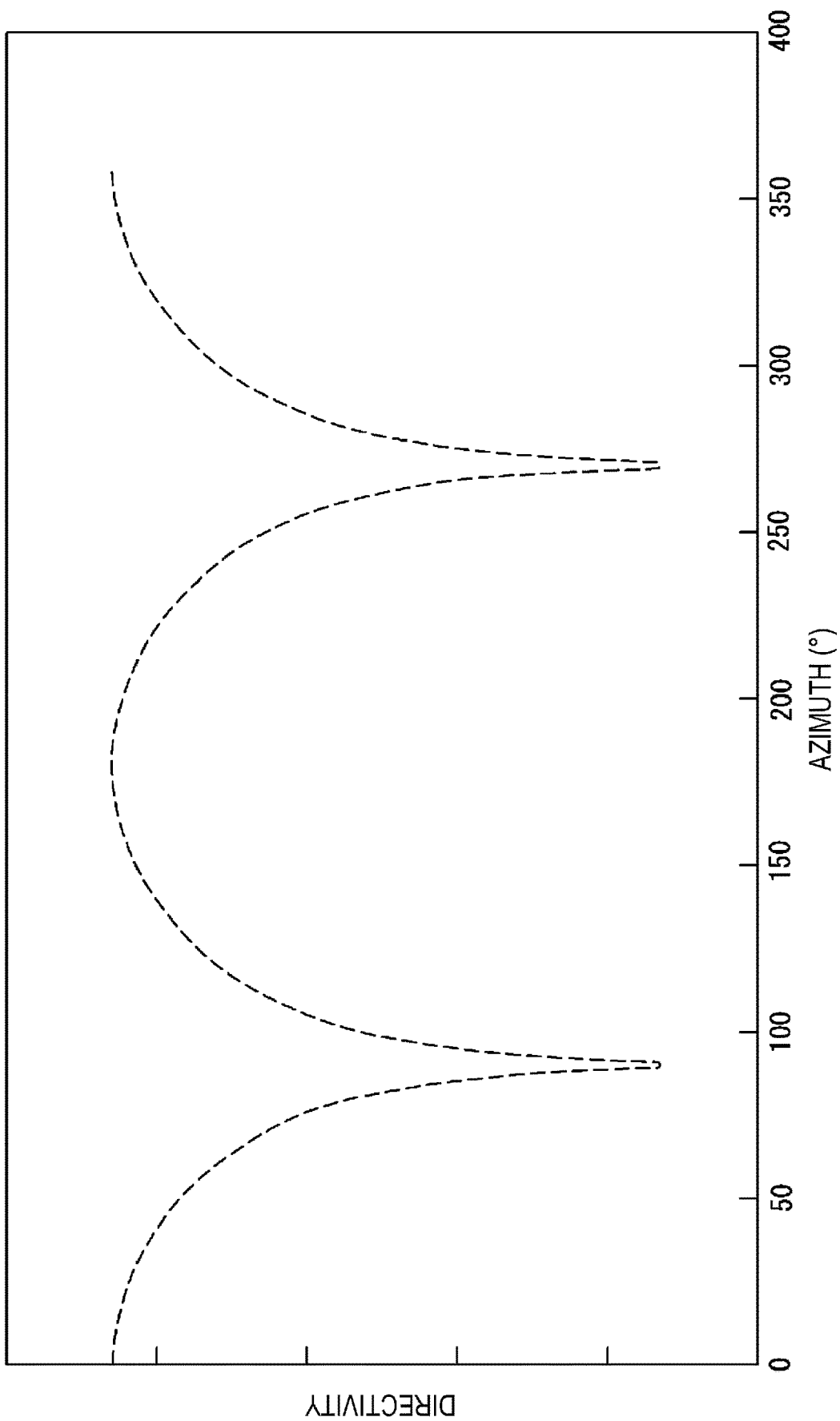
FIG. 2 illustrates an example of the directivity of the electronic device according to an embodiment.

FIG. 2 is presented to describe shadow regions (null points) formed at the time when beamforming is performed by using the adaptive array antenna. FIG. 2 may be regarded as representing the antenna directivity at the time when the electronic device 1 illustrated in FIG. 1 performs beamforming. In FIG. 2, the horizontal axis represents the azimuth with the receiving antennas 10 as a reference point, and the vertical axis represents the directivity of the array antenna including the receiving antennas 10. A broken line in FIG. 2 denotes the directivity varying with azimuth. FIG. 2 illustrates an example in which the directivity (intensity of beam radiation) is high at azimuth angles of about 0°, about 180°, and about 360°. In the example illustrated in FIG. 2, shadow regions (null points) are formed at azimuth angles of about 90° and about 270°. For convenience, the directivity in the frontal direction) (0° is presented in FIG. 2.

The approach proposed in Patent Literature 1, the approach proposed in Patent Literature 2, and other methods for implementing weighting for an array antenna entail occurrence of unwanted null and, by extension, formation of shadow regions in the directions of null points. Similarly, forming null points in desired directions through null steering entails occurrence of undesired null in other directions and, by extension, formation of shadow regions in the directions of the undesired null points.

As a workaround, the electronic device 1 according to an embodiment employs Adaptive Array to increase the antenna directivity in such a way as to compensate for the undesired null points. With the directivity increased through the use of Adaptive Array, the electronic device 1 according to an embodiment enables highly reliable communications in a desired direction. At the same time, the electronic device 1 according to an embodiment compensates for null points such that shadow regions associated with the null points are eliminated or reduced.

Figure 3:
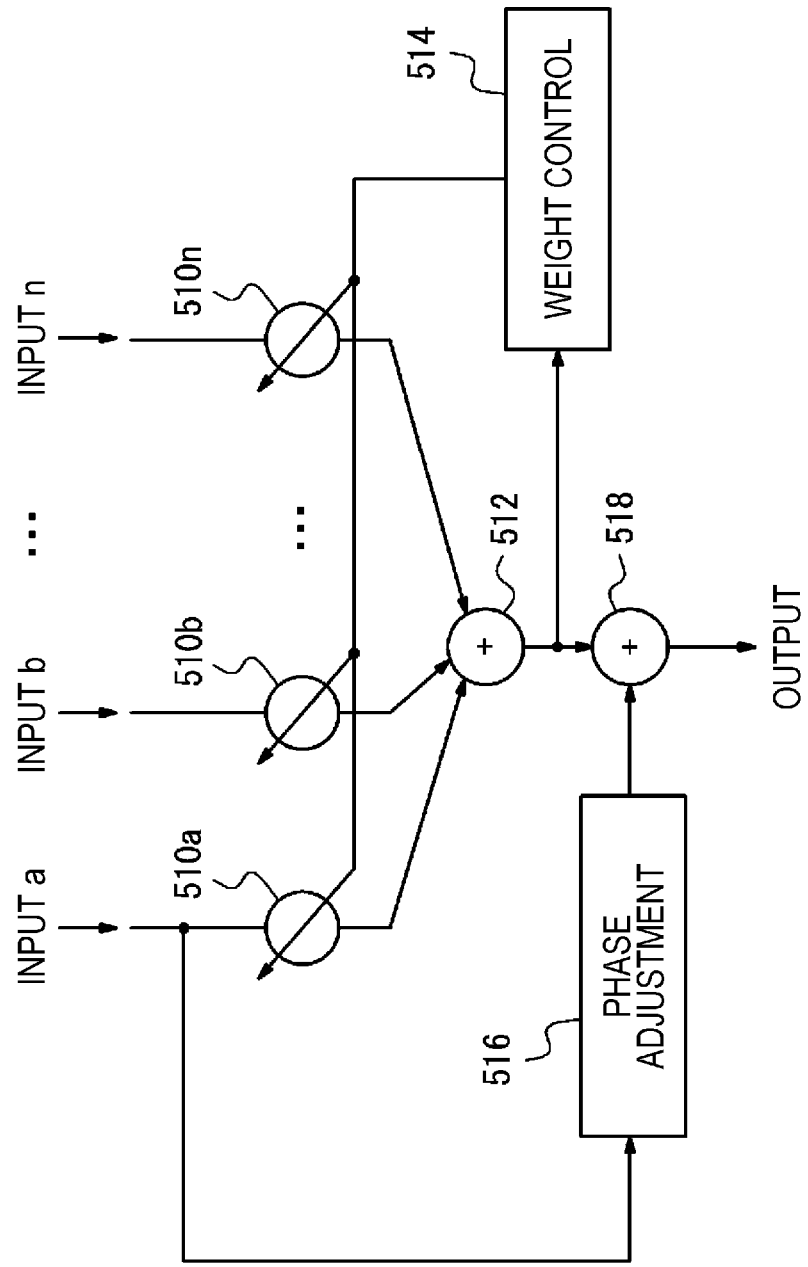
FIG. 3 illustrates processing performed by a controller in an embodiment.

FIG. 3 illustrates the digital signal processing performed by the controller 50 of the electronic device 1 according to an embodiment. The digital signal processing is performed on signals received through the receiving antennas 10. The following describes an example in which the processing, that is, the digital signal processing illustrated in FIG. 3 is performed by the controller 50.

A signal received through the receiving antenna 10a illustrated in FIG. 1 passes through a signal path to the controller 50. Referring to FIG. 3, the signal path is an input a. More specifically, a signal received through the receiving antenna 10a of the electronic device 1 illustrated in FIG. 1 passes through the input a in FIG. 3 and is then input to the controller 50 by way of the LNA 20a, the downconverter 30a, and the ADC 40a. Likewise, a signal received through the receiving antenna 10b illustrated in FIG. 1 passes through a signal path to the controller 50. Referring to FIG. 3, the signal path is an input b. More specifically, a signal received through the receiving antenna 10b of the electronic device 1 illustrated in FIG. 1 passes through the input b in FIG. 3 and is then input to the controller 50 by way of the LNA 20b, the downconverter 30b, and the ADC 40b. A signal received through the receiving antenna 10n illustrated in FIG. 1 passes through a signal path to the controller 50. Referring to FIG. 3, the signal path is an input n. Thus, each of the input a, the input b, . . . , and the input n in FIG. 3 is provided for the corresponding one of the receiving antennas 10 illustrated in FIG. 1.

Referring to FIG. 3, a signal coming out of the input a undergoes weight adjustment in a weight adjustment unit 510a and is then input to an addition unit 512. Likewise, a signal coming out of the input b undergoes weight adjustment in a weight adjustment unit 510b and is then input to the addition unit 512. A signal coming out of the input n undergoes weight adjustment in a weight adjustment unit 510n and is then input to the addition unit 512. The weight adjustment unit 510a, the weight adjustment unit 510b, . . . , and the weight adjustment unit 510n are also herein simply referred to as weight adjustment units 510 when there is no need to distinguish one from another.

The addition unit 512 adds up the results given by the weight adjustment units 510. The result given by the addition unit 512 is then input to a weight control unit 514 and an addition unit 518.

The weights adjusted by the respective weight adjustment units 510 are then controlled by the weight control unit 514 on the basis of the result given by the addition unit 512. That is, the weight control unit 514 controls weights adjusted for the respective signals input to the weight adjustment units 510. For example, the weight control unit 514 may use a predetermined algorithm to control weighting for outputs from the antennas included in the array antenna. More specifically, the weight control unit 514 may perform control for enabling beamforming and/or null steering.

Referring to FIG. 3, a signal coming out of one of the input a, the input b, . . . , and the input n is input to the corresponding weight adjustment unit 510 and to a phase adjustment unit 516. FIG. 3 illustrates an example in which a signal coming out of the input a is input to the weight adjustment unit 510a and to the phase adjustment unit 516. In another example, a signal coming out of the input b is input to the weight adjustment unit 510b and to the phase adjustment unit 516.

The phase adjustment unit 516 adjusts the phase of a signal coming out of one of the input a, the input b, . . . , and the input n. For example, the phase of a signal coming out of the input a may be adjusted by the phase adjustment unit 516 in accordance with the phase of a signal output from the addition unit 512. More specifically, the phase adjustment unit 516 may perform phase adjustment in such a manner that a signal coming out of the input a is brought in phase with a signal output from the addition unit 512. The signal subjected to phase adjustment in the phase adjustment unit 516 is then input to the addition unit 518.

The addition unit 518 adds up the calculation result given by the addition unit 512 and the calculation result given by the phase adjustment unit 516. The calculation result given by the addition unit 518 may be regarded as an output from the controller 50, that is, as the reception signal in FIG. 1.

That is, an output from one of the receiving antennas 10 included in the array antenna may be brought in phase with an output of the array antenna before the signals are combined and put out by the controller 50. The phase adjustment unit 516 is a functional unit by which an output from one of the receiving antennas 10 included in the array antenna is brought in phase with an output of the array antenna. The principle of how the phase is adjusted may be understood by analogy to equal gain combining for diversity antennas. Equal gain combining is a known technique and will not be further elaborated here. The phase adjustment unit 516 is configured to adjust the phase in such a way as to maximize the power output.

Figure 4:
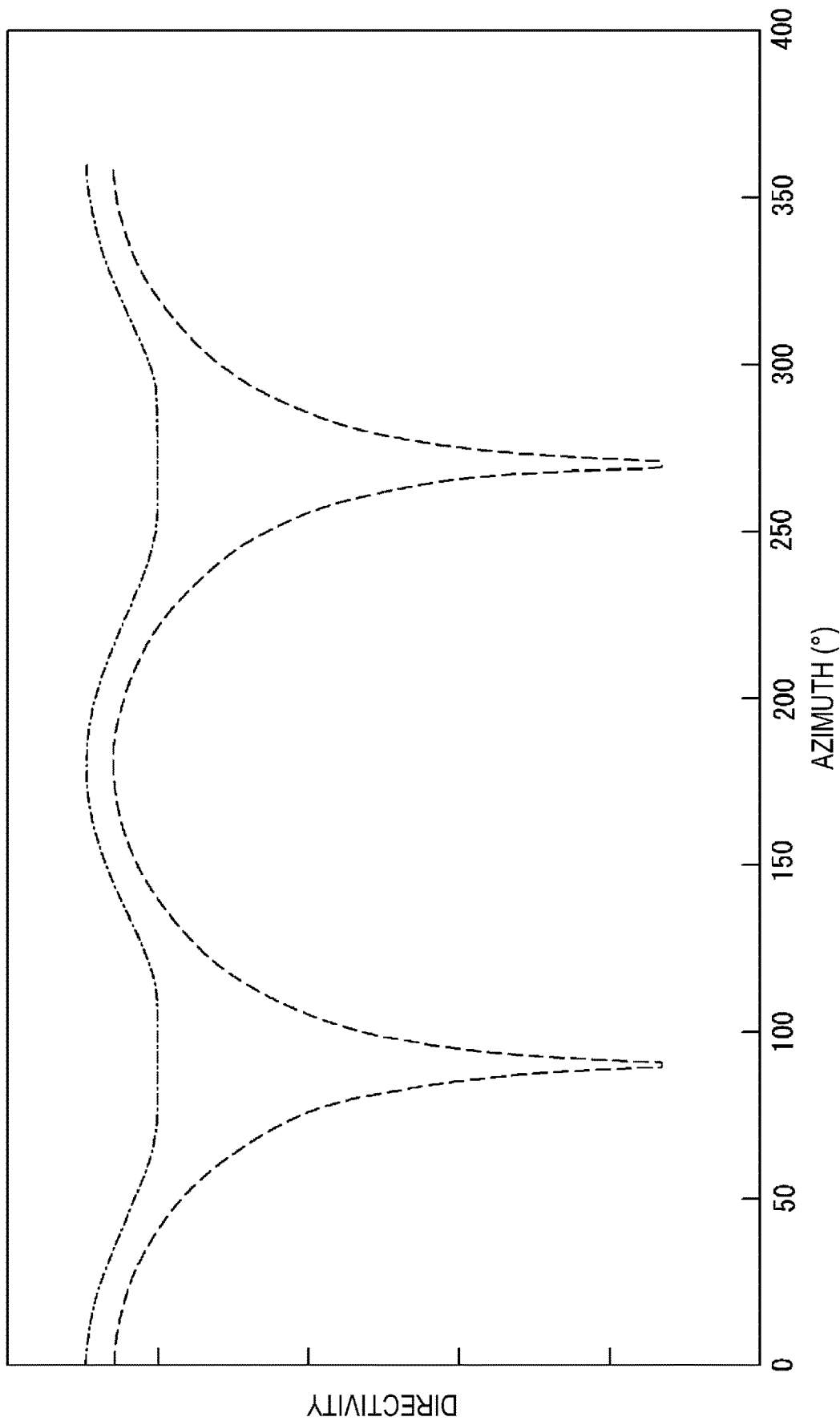
FIG. 4 illustrates an example of the directivity of the electronic device according to an embodiment.

FIG. 4 illustrates an example of the results of the digital signal processing (see FIG. 3) performed by the controller 50. As with FIG. 2, FIG. 4 may be regarded as representing the antenna directivity at the time when the electronic device 1 illustrated in FIG. 1 performs beamforming. The horizontal and vertical axes in FIG. 4 may correspond to those in FIG. 2; that is, the horizontal axis represents the azimuth with the receiving antennas 10 as a reference point, and the vertical axis represents the directivity of the array antenna including the receiving antennas 10.

For comparison, the results in FIG. 2 are denoted by a broken line in FIG. 4. The results of the digital signal processing performed as in FIG. 3 are denoted by a dash-dot line in FIG. 4. In the example illustrated in FIG. 2, shadow regions (null points) are formed at azimuth angles of about 90° and about 270°. As for the example illustrated in FIG. 4, shadow regions (null points) at azimuth angles of about 90° and about 270° are compensated for and reduced. This is due to the digital signal processing illustrated in FIG. 3. For convenience, the directivity in the frontal direction (0°) is presented in FIG. 4, as in FIG. 2. The dash-dot line in FIG. 4 is curved. This can be regarded as meaning that a beam is focused frontward (at 0°), with the array antenna being not completely isotropic. Meanwhile, the shadow regions are at least partially eliminated.

As has been described so far, the controller 50 of the electronic device 1 according to an embodiment controls the directivity of the array antenna. While controlling the directivity, the controller 50 compensates at least partially for the reception sensitivity at the null points in the directivity of the array antenna by using a predetermined antenna element, namely, one of the receiving antennas 10 (e.g., the receiving antenna 10a). The controller 50 may combine the output from a predetermined antenna element (e.g., the receiving antenna 10a) with the output obtained by combining the outputs from the other antenna elements (the other receiving antennas 10) and may then put out the resultant total output. That is, the controller 50 may include the addition unit 518. The controller 50 may also perform phase adjustment by which the output from a predetermined antenna element (e.g., the receiving antenna 10a) is brought in phase with the output obtained by combining the outputs from the other antenna elements (the other receiving antennas 10). That is, the controller 50 may include the phase adjustment unit 516. More specifically, the phase adjustment unit 516 may perform phase adjustment in such a manner that a signal coming out of the input a is brought in phase with a signal output from the addition unit 512. The signal subjected to phase adjustment in the phase adjustment unit 516 is then input to the addition unit 518. The controller 50 may weight the output from the antenna elements on the basis of the output obtained by combining the outputs from the antenna elements. That is, the controller 50 may include the weight control unit 514.

The electronic device 1 according to an embodiment employs Adaptive Array to enable communications with a local increase in reliability and is also capable of providing wide area communications, in like manner as is provided by broadcast. The electronic device 1 according to an embodiment is capable of compensating for null points in the directivity increased through the use of Adaptive Array. The electronic device 1 is capable of eliminating or reducing shadow regions associated with null points to enhance its communication performance in a specific direction and is also capable of providing wide area communications.

As described above, the electronic device 1 according to an embodiment uses the adaptive array antenna to reduce shadow regions (null points) at the time of reception of radio waves. The electronic device 1 according to an embodiment can thus increase the utility of the adaptive array antenna.

Second Embodiment

The following describes an electronic device according to a second embodiment, where the electronic device is denoted by 1. The configuration of the electronic device 1 according to the second embodiment may be analogous to the electronic device 1 according to the first embodiment, which has been described above with reference to FIG. 1. As for the electronic device 1 according to the second embodiment, the digital signal processing described above with reference to FIG. 3 may be partially changed. Features similar to what has been described above in relation to the electronic device 1 according to the first embodiment will be briefly touched on or omitted where appropriate.

Figure 5:
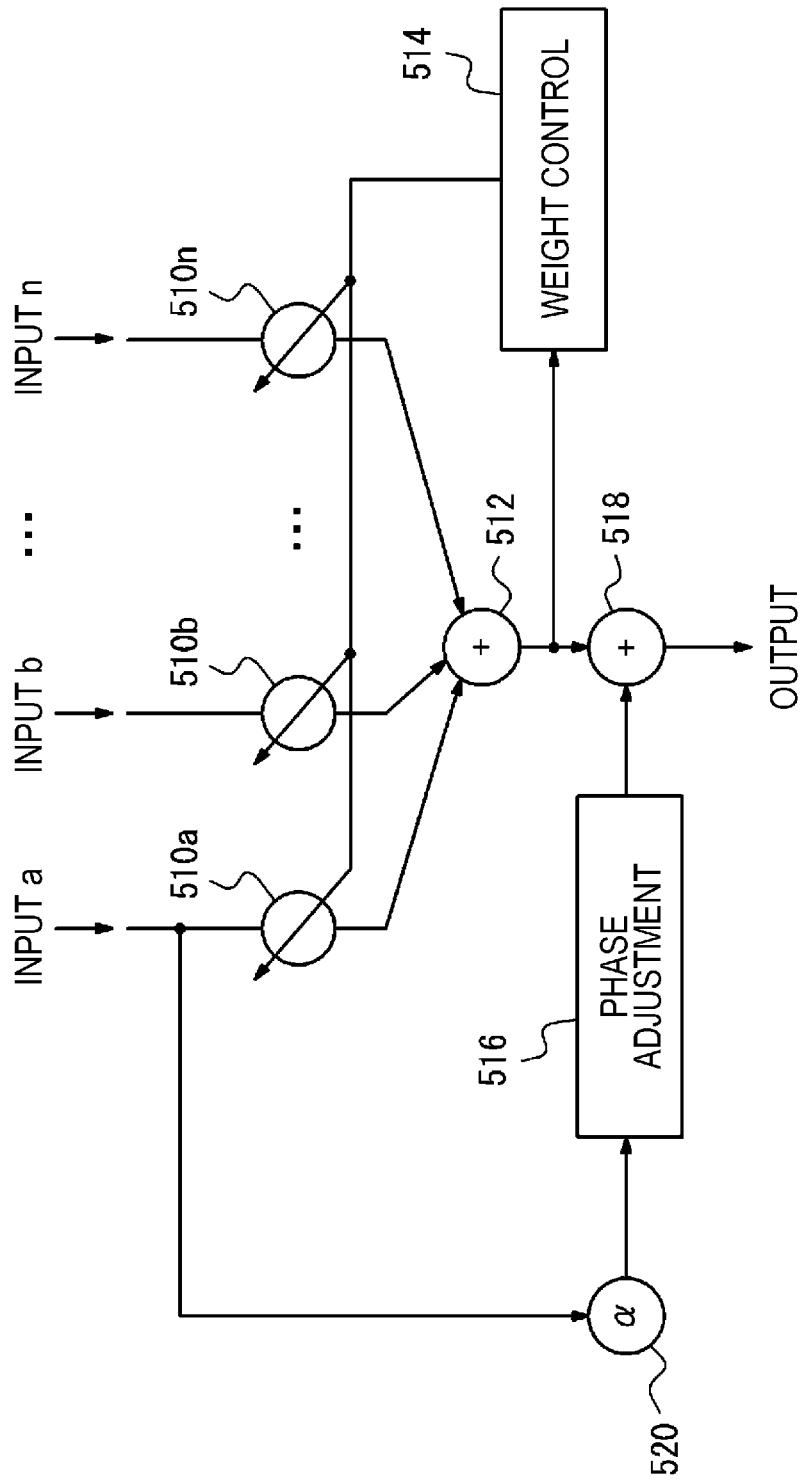
FIG. 5 illustrates processing performed by a controller in an embodiment.

FIG. 5 illustrates the digital signal processing performed by the controller 50 of the electronic device 1 according to an embodiment. The digital signal processing is performed on signals received through the receiving antennas 10. The following describes an example in which the processing, that is, the digital signal processing illustrated in FIG. 5 is performed by the controller 50.

The digital signal processing illustrated in FIG. 5 involves the addition of a multiplication unit 520 to what is illustrated in FIG. 3. As in FIG. 3, a signal coming out of one of the input a, the input b, . . . , and the input n is input to the corresponding weight adjustment unit 510 and to the phase adjustment unit 516. Referring to FIG. 5, a signal coming out of the input a is input to the weight adjustment unit 510a and to the phase adjustment unit 516. As for the digital processing illustrated in FIG. 5, a signal coming out of one of the input a, the input b, . . . , and the input n undergoes multiplication in the multiplication unit 520 before being input to the phase adjustment unit 516. The multiplication unit 520 may be configured to serve as an amplifier appropriately designed to multiply an input signal by a predetermined coefficient. The multiplication product given by the multiplication unit 520 is input to the phase adjustment unit 516. The digital signal processing illustrated in FIG. 5 may be identical to the digital signal processing illustrated in FIG. 3 except that the multiplication unit 520 is additionally involved.

What the processing illustrated in FIG. 3 and the processing illustrated in FIG. 5 have in common may be that an output from one of the receiving antennas 10 included in the array antenna is brought in phase with an output of the array antenna before the signals are combined and put out by the controller 50. The multiplication unit 520 involved in the processing illustrated in FIG. 5 performs a calculation in which an output from one of the receiving antennas 10 included in the array antenna is multiplied by the predetermined coefficient. The multiplication product may be brought in phase with an output of the array antenna and may then be put out by the multiplication unit 520. As in the previous embodiment, the phase adjustment unit 516 involved in the processing illustrated in FIG. 5 is a functional unit by which an output from one of the receiving antennas 10 included in the array antenna is brought in phase with an output of the array antenna.

Figure 6:
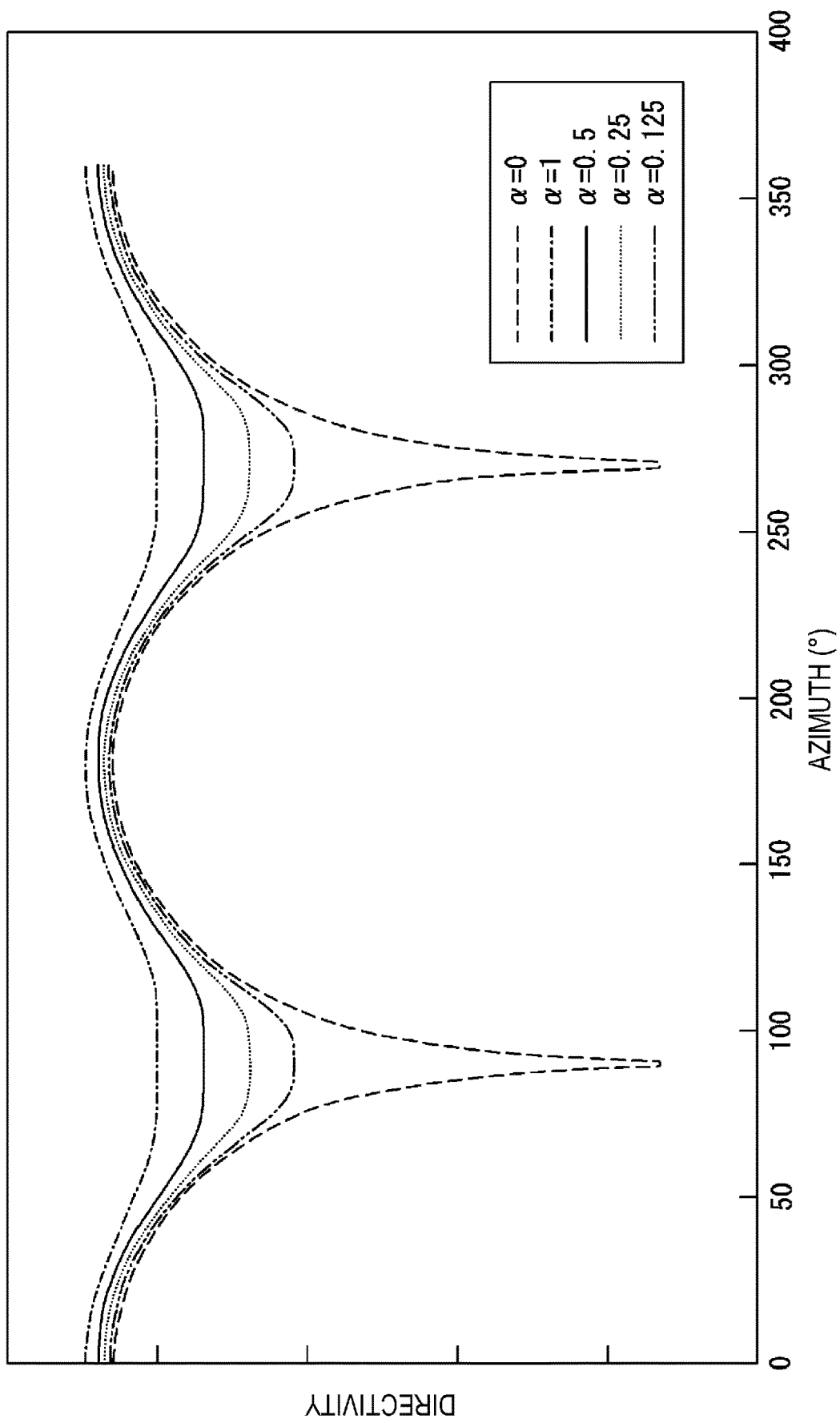
FIG. 6 illustrates an example of the directivity of an electronic device according to an embodiment.

FIG. 6 illustrates an example of the results of the digital signal processing (see FIG. 5) performed by the controller 50. As with FIGS. 2 and 4, FIG. 6 may be regarded as representing the antenna directivity at the time when the electronic device 1 illustrated in FIG. 1 performs beamforming. The horizontal and vertical axes in FIG. 6 may correspond to those in FIGS. 2 and 4; that is, the horizontal axis represents the azimuth with the receiving antennas 10 as a reference point, and the vertical axis represents the directivity of the array antenna including the receiving antennas 10.

For comparison, the results in FIG. 2 and the results in FIG. 4 are also presented in FIG. 6. The curve ($\alpha=0$) that is a broken line in FIG. 6 denotes the results illustrated in FIGS. 2 and 4. The curve ($\alpha=0$) in FIG. 6 represents a case in which the multiplication coefficient used by the multiplication unit 520 in FIG. 5 is 0. The curve ($\alpha=1$) that is a dash-dot line line in FIG. 6 denotes the results illustrated in FIG. 4. The curve ($\alpha=1$) in FIG. 6 represents a case in which the multiplication coefficient used by the multiplication unit 520 in FIG. 5 is 1. The other curves ($\alpha=0.5$, $\alpha=0.25$, and $\alpha=0.125$) in FIG. 6 represent cases in which the multiplication coefficients used by the multiplication unit 520 in FIG. 5 are 0.5, 0.25, and 0.125, respectively.

The results represented by the curve for $\alpha=0$ in FIG. 6 do not differ from the results of beamforming (see FIGS. 2 and 4) performed in the usual way by the electronic device 1 in FIG. 1; that is, the beamforming entails formation of shadow regions in the directivity. The curves for $\alpha=0.125$, $\alpha=0.25$, $\alpha=0.5$, and $\alpha=1$ in FIG. 6 can each be regarded as meaning that a beam is focused frontward (at 0°), with the array antenna being not completely isotropic. Meanwhile, the shadow regions are at least partially eliminated.

As has been described so far, the controller 50 of the electronic device 1 may multiply the output from a predetermined antenna element (e.g., the receiving antenna 10a) by a predetermined coefficient. That is, the controller 50 may include the multiplication unit 520. The controller 50 of the electronic device 1 may also perform phase adjustment by which the output multiplied by the predetermined coefficient is brought in phase with the output obtained by combining the outputs from the other antenna elements (the other receiving antennas 10). That is, the controller 50 may perform phase adjustment in such a manner that the output multiplied by the predetermined coefficient is brought in phase with a signal output from the addition unit 512.

The electronic device 1 according to an embodiment produces effects similar to effects produced by the electronic device 1 according to the first embodiment. More specifically, the electronic device 1 according to an embodiment is capable of eliminating or reducing shadow regions associated with null points to enhance its communication performance in a specific direction and is also capable of providing wide area communications. The electronic device 1 according to an embodiment is also capable of adjusting the degree to which shadow regions (in the directions of null points) are compensated for.

Third Embodiment

The following describes an electronic device according to a third embodiment, where the electronic device is denoted by 1. The third embodiment is similar to the second embodiment in the following respect: the configuration of the electronic device 1 according to the third embodiment may be analogous to the electronic device 1 according to the first embodiment, which has been described above with reference to FIG. 1. As for the electronic device 1 according to the third embodiment, the digital signal processing described above with reference to FIG. 5 may be partially changed. Features similar to what has been described above in relation to the electronic device 1 according to the first embodiment and/or the electronic device 1 according to the second embodiment will be briefly touched on or omitted where appropriate.

Figure 7:
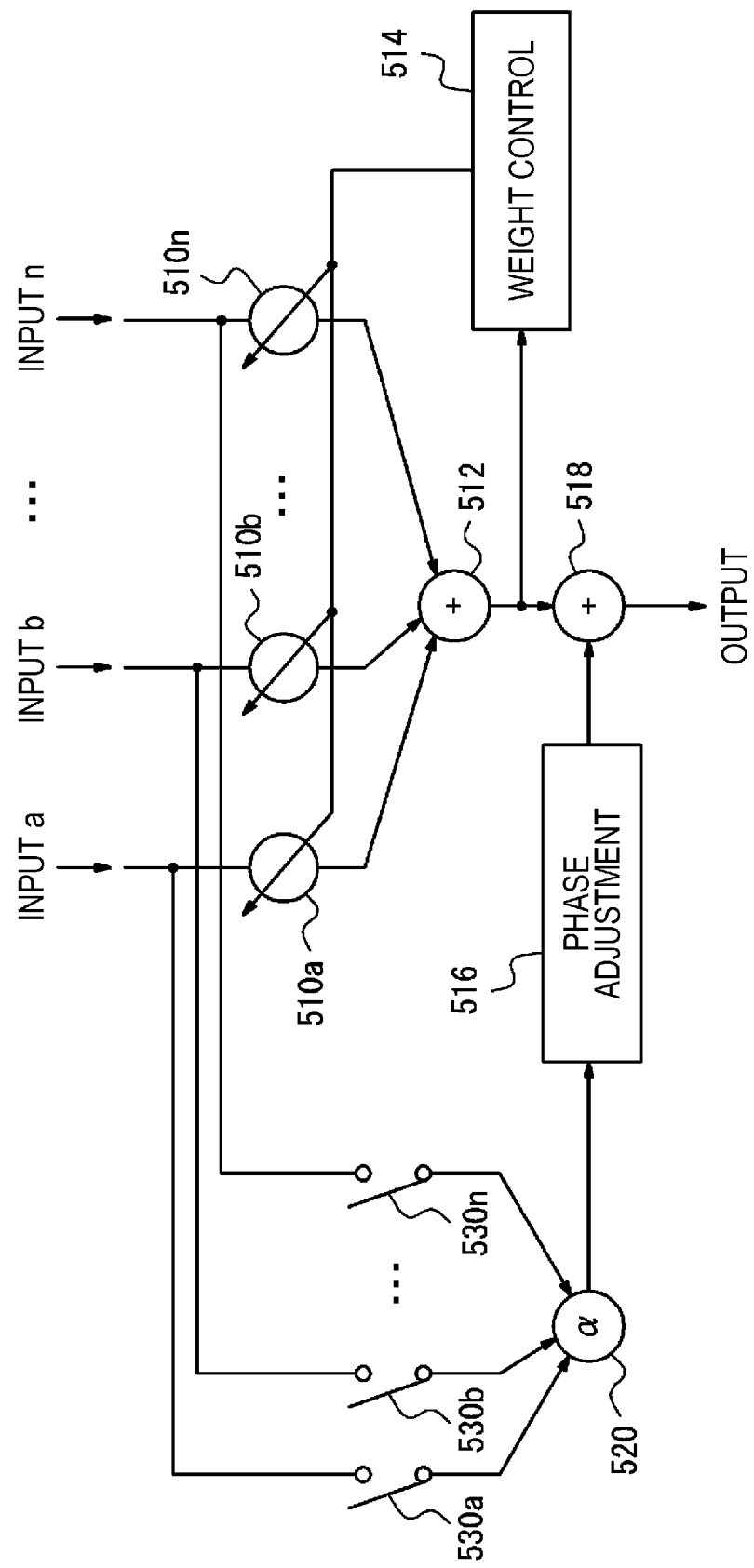
FIG. 7 illustrates processing performed by a controller in an embodiment.

FIG. 7 illustrates the digital signal processing performed by the controller 50 of the electronic device 1 according to an embodiment. The digital signal processing is performed on signals received through the receiving antennas 10. The following describes an example in which the processing, that is, the digital signal processing illustrated in FIG. 7 is performed by the controller 50.

In the second embodiment described above with reference to FIG. 5, a signal coming out of one of the input a, the input b, . . . , and the input n (e.g., a signal coming out of the input a) is input to the corresponding weight adjustment unit 510 and is also input to the phase adjustment unit 516 by way of the multiplication unit 520. The choice of which signal to input to the phase adjustment unit 516 by way of the multiplication unit 520 in the second embodiment (see FIG. 5) may be determined as appropriate. Under fading environments, inputs of varying levels are conceivably received through the respective receiving antennas 10. In such a case, an input received through the receiving antenna 10 where the signal level is higher than in the other receiving antennas 10 may be selected from among the inputs received through the respective receiving antennas 10. That is, the controller 50 of the electronic device 1 according to an embodiment may be configured to select a signal from among inputs received through the receiving antennas 10 and to combine the selected signal with the output of the array antenna.

A switching unit 530a (see FIG. 5) performs switching to open or close a path through which a signal coming out of the input a passes to the phase adjustment unit 516 by way of the multiplication unit 520. A switching unit 530b (see FIG. 5) performs switching to open or close a path through which a signal coming out of the input b passes to the phase adjustment unit 516 by way of the multiplication unit 520. Likewise, a switching unit 530n (see FIG. 5) may perform switching to open or close a path through which a signal coming out of the input n passes to the phase adjustment unit 516 by way of the multiplication unit 520. The switching unit 530a, the switching unit 530b, . . . , and the switching unit 530n are also herein simply referred to as switching units 530 when there is no need to distinguish one from another. The controller 50 in an embodiment may include two or more switching units 530. The number of switching units 530 is not limited to particular values. For example, the switching units 530 included in the controller 50 in an embodiment may be equal in number to the inputs denoted by a, b, . . . , and n. The controller 50 may exercise control by which the switching units 530 performs switching in such a manner that a signal coming out of one of the input a, the input b, . . . , and the input n is input to the phase adjustment unit 516 by way of the multiplication unit 520.

As described above, the controller 50 of the electronic device 1 according to an embodiment may select an output from among outputs from the respective antenna elements (the receiving antennas 10), in which case the selected output is regarded as the output from the predetermined antenna element. The controller 50 may select, from among the outputs from the respective antenna elements (the receiving antennas 10), the output from the antenna element where the signal level is higher than in the other antenna elements, in which case the selected output is regarded as the output from the predetermined antenna element. The controller 50 may select the output from the predetermined antenna element by switching among the paths for outputs from the antenna elements (the receiving antennas 10). That is, the controller 50 may include the switching unit 530.

As described above, an input received through the receiving antenna 10 where the signal level is higher than in the other receiving antennas 10 is selected from among the inputs received through the respective receiving antennas 10. Alternatively, an input may be selected from among the inputs received through the respective receiving antennas 10, on the basis of results of calculations for implementing weighting for the array antenna. Calculations for implementing weighting for the array antenna may be performed by an algorithm part that controls the array weight. For example, calculations for implementing weighting for the array antenna is performed by the weight control unit 514 illustrated in FIG. 7. The weight control unit 514 may use a maximum-ratio combining algorithm to perform calculations for implementing weighting for the array antenna, in which case the receiving antenna 10 corresponding to the maximum weighting factor of the array antenna is selected.

Fourth Embodiment

The following describes an electronic device according to a fourth embodiment, where the electronic device is denoted by 1. The fourth embodiment is similar to the third embodiment in the following respect: the configuration of the electronic device 1 according to the fourth embodiment may be analogous to the electronic device 1 according to the first embodiment, which has been described above with reference to FIG. 1. As for the electronic device 1 according to the fourth embodiment, the digital signal processing described above with reference to FIG. 7 may be partially changed. Features similar to what has been described above in relation to the electronic device 1 according to the first embodiment, the electronic device 1 according to the second embodiment, and/or the electronic device 1 according to the third embodiment will be briefly touched on or omitted where appropriate.

As can be seen in FIGS. 4 and 6, each of the electronic devices 1 according to the first to third embodiments compensates for all the null points (shadow regions). In the present embodiment, the electronic device 1 may implement compensation in a selective manner; that is, the electronic device 1 may compensate for a specified null point (e.g., some of the null points) only.

Figure 8:
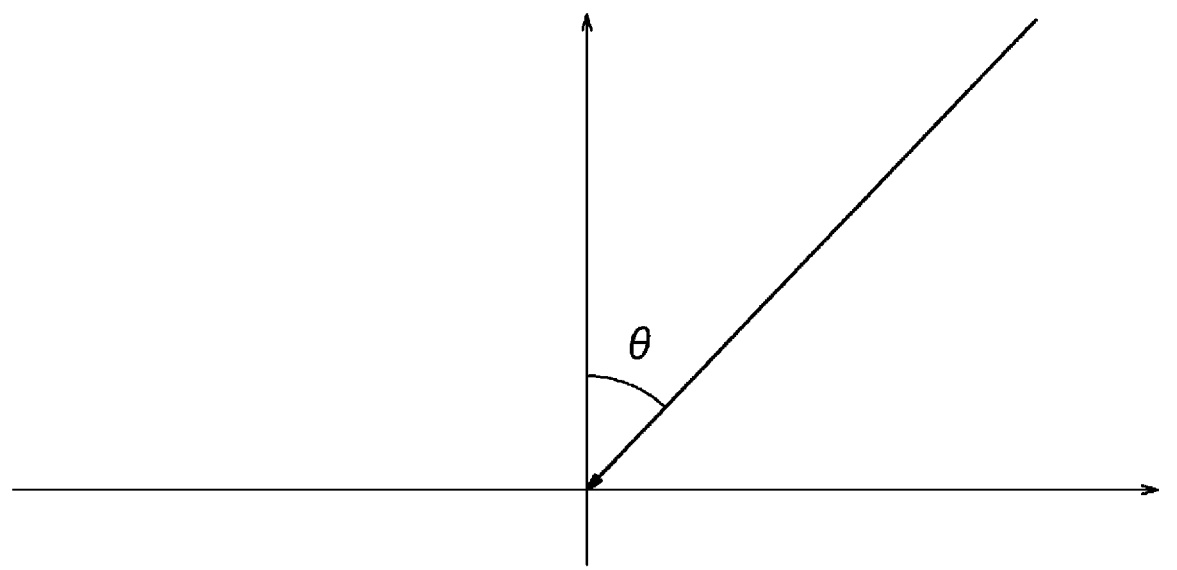
FIG. 8 illustrates processing performed by a controller in an embodiment.
Figure 8:
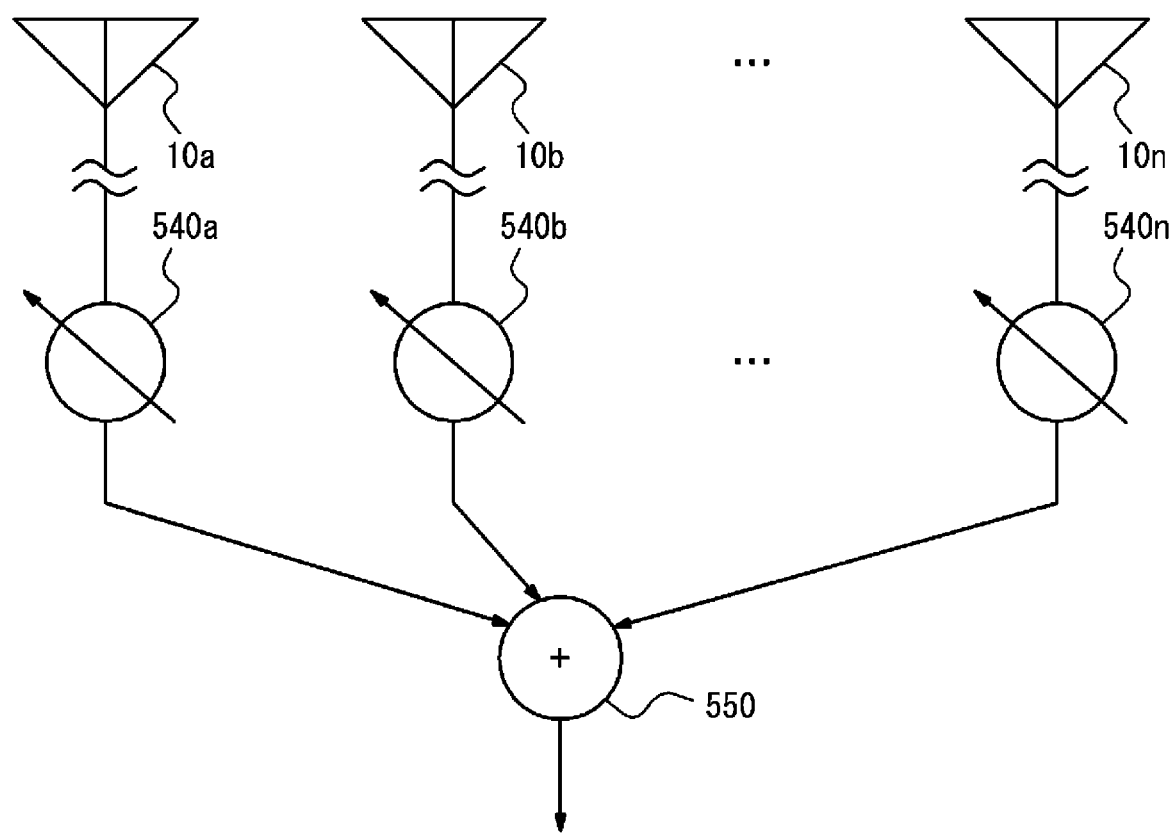

FIG. 8 illustrates an example of (the arrangement of the receiving antennas 10 included in) the array antenna of the electronic device 1 according to an embodiment. For convenience, FIG. 8 illustrates an example in which the receiving antennas 10 (e.g., the receiving antenna 10a, the receiving antenna 10b, . . . , and the receiving antenna 10n) of the electronic device 1 according to an embodiment are arranged linearly with equal spaces. It is not required that the receiving antennas 10 in an embodiment be arranged linearly with equal spaces.

The directivity $D(\theta)$ (see FIG. 8) of the array antenna including receiving antennas (the receiving antennas 10) arranged linearly with equal spaces can be written as Equation (1), where $w_i$ denotes the weighting implemented for in the array antenna, d denotes the spaces between antenna elements, and $\lambda$ denotes the wavelength.

[Math 1]

$$D(\theta) = \sum_{i=0}^{N-1} w_i \exp\left[-j\frac{2\pi i d}{\lambda}\sin(\theta)\right] \quad (1)$$

The controller 50 in an embodiment can determine the weighting implemented for the array antenna and, by extension, the antenna directivity. That is, the controller 50 can obtain information about null points (shadow regions) by solving Equation (1). The controller 50 of the electronic device 1 according to an embodiment performs beamforming in such a way as to focus beams on null points that are to be compensated for. In this way, the controller 50 can compensate for the null points (shadow regions).

Figure 9:
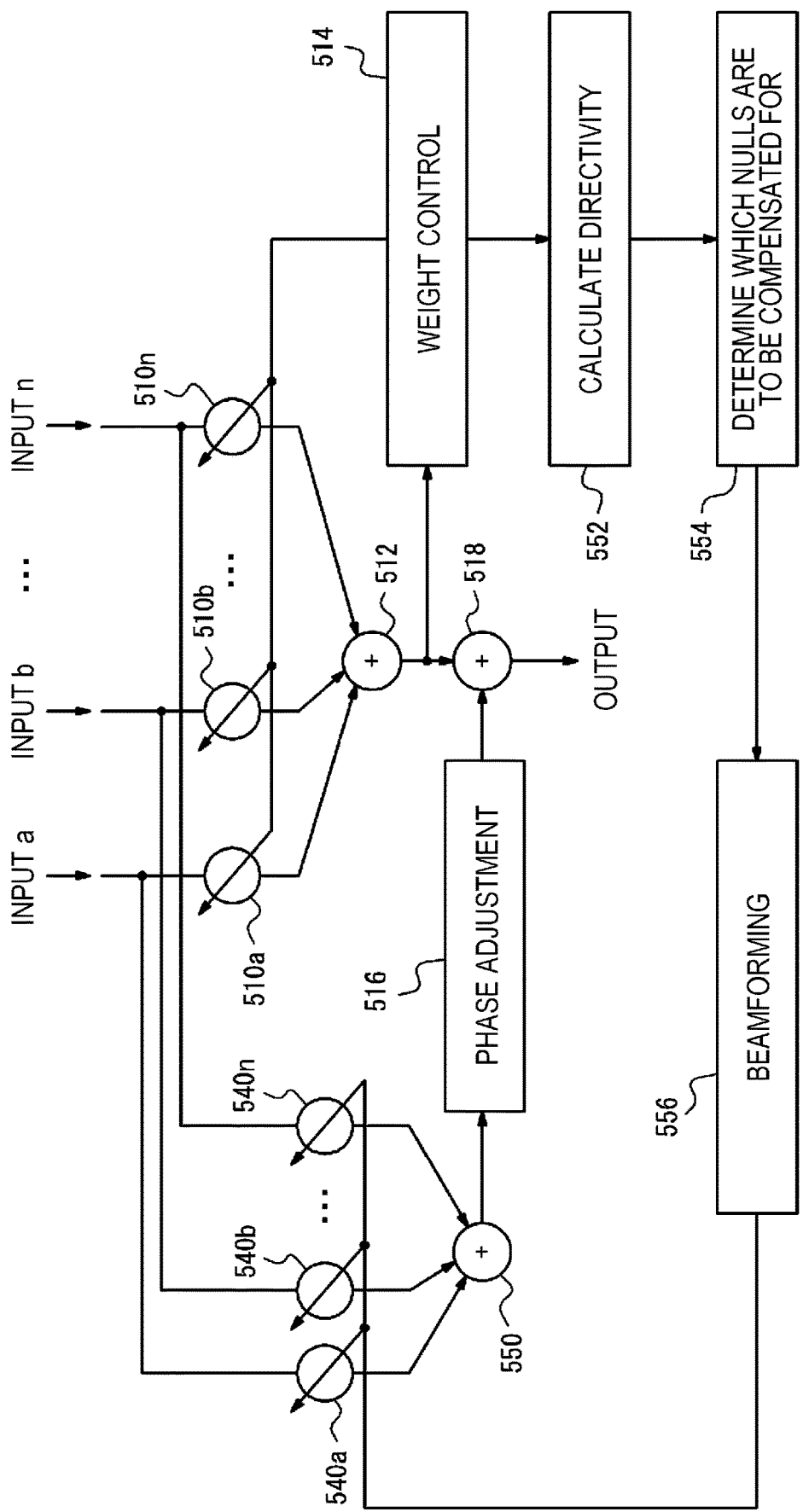
FIG. 9 illustrates processing performed by the controller in an embodiment.

FIG. 9 illustrates the digital signal processing performed by the controller 50 of the electronic device 1 according to an embodiment. The digital signal processing is performed on signals received through the receiving antennas 10. The following describes an example in which the processing, that is, the digital signal processing illustrated in FIG. 9 is performed by the controller 50.

In the third embodiment described above with reference to FIG. 7, each of the signals coming out of the input a, the input b, . . . , and the input n is input to the corresponding one of the switching units 530 and then to the multiplication unit 520 before being input to the phase adjustment unit 516. The fourth embodiment differs from the third embodiment in the following respects. Referring to FIG. 9, a signal coming out of the input a undergoes weight adjustment in a weight adjustment unit 540a and is then input to an addition unit 550. Likewise, a signal coming out of the input b undergoes weight adjustment in a weight adjustment unit 540b and is then input to the addition unit 550. A signal coming out of the input n undergoes weight adjustment in a weight adjustment unit 540n and is then input to the addition unit 550. The weight adjustment unit 540a, the weight adjustment unit 540b, . . . , and the weight adjustment unit 540n are also herein simply referred to as weight adjustment units 540 when there is no need to distinguish one from another.

After undergoing weight adjustment in the weight adjustment units 540, the signals are added up by the addition unit 550, as illustrated in FIG. 9. The result given by the addition unit 550 is subjected to phase adjustment in the phase adjustment unit 516 and is then input to the addition unit 518. More specifically, the phase adjustment unit 516 may perform phase adjustment in such a manner that the signals given by the weight adjustment units 540 are brought in phase with the signal output from the addition unit 512. The signal subjected to phase adjustment in the phase adjustment unit 516 is then input to the addition unit 518.

As mentioned above, the controller 50 can determine the weighting implemented for the array antenna and, by extension, the antenna directivity. Referring to FIG. 9, the controller 50 in an embodiment may cause a calculation unit 552 to calculate the directivity on the basis of the result of weighting controlled by the weight control unit 514. That is, the controller 50 can obtain information about null points (shadow regions) by solving Equation (1) mentioned above. Referring to FIG. 9, the controller 50 in an embodiment may cause a determination unit 554 to determine, on the basis of the directivity calculated by the calculation unit 552, which null points are to be compensated for. As mentioned above in relation to the third embodiment, the controller 50 performs beamforming in such a way as to focus beams on null points that are to be compensated for. In this way, the controller 50 can compensate for the null points (shadow regions). This is also applicable to FIG. 9, in which the determination unit 554 determines which null points are to be compensated for. In this case, the controller 50 in an embodiment may cause a beamforming unit 556 to perform beamforming on the basis of the determination as to which null points are to be compensated for.

As illustrated in FIG. 9, the controller 50 in an embodiment may control weighting in the weight adjustment units 540 on the basis of the beamforming performed by the beamforming unit 556.

The controller 50 of the electronic device 1 according to an embodiment may perform control to compensate at least partially for the reception sensitivity at a specified null point in the directivity of the array antenna including the receiving antennas 10. The electronic device 1 according to an embodiment is also capable of compensating for null points (shadow regions) in a selective manner.

Although the present disclosure has been described above with reference to the accompanying drawings and by means of examples, various alterations or modifications may be readily made on the basis of the present disclosure by those skilled in the art. It is to be understood that such alterations and modifications fall within the scope of the present disclosure. For example, functions and the like of each functional unit can be rearranged in any way that involves no logical inconsistency. The functional units can be combined into one or divided. It is not required that the embodiments of the present disclosure be implemented with a high degree of fidelity to what has been described above. Where appropriate, the embodiments may be implemented with the respective features used in combination, and or some of the features may be omitted. That is, various alterations or modifications may be made on the basis of the present disclosure by those skilled in the art. It is to be understood that such alterations and modifications fall within the scope of the present disclosure. For example, any of the functional units, means, steps, and the like of an embodiment may be added to another embodiment in any way that involves no logical inconsistency, or any of the features of an embodiment may be replaced with that of another embodiment. For example, functional units, means, steps, and the like of each embodiment can be combined into one or divided. It is not required that the embodiments of the present disclosure be implemented with a high degree of fidelity to what has been described above. Where appropriate, the embodiments may be implemented with the respective features used in combination, and or some of the features may be omitted.

Embodiments have been described in which an electronic device is a receiver configured to receive radio waves. That is, the electronic device 1 according to an embodiment may receive radio waves through an array antenna including the receiving antennas 10. Alternatively, the electronic device 1 according to an embodiment may serves as a transmitter instead of serving as a receiver or may serve as both a transmitter and a receiver. That is, the embodiments described above may be implemented as an electronic device that serves as a transmitter. For example, each receiving antenna 10, each LNA 20, each downconverter 30, and each ADC 40 may be replaced with a transmitting antenna, a power amplifier, an upconverter, and a digital-to-analog converter (DAC), respectively. The power amplifiers included in place of the LNA 20 may be power amplifiers. The upconverter included in place of the downconverters 30 may be configured to convert inputs into signals of high frequency. The DACs included in place of the ADCs 40 may be configured to convert digital signals into analog signals.

The embodiments described above are not limited to the electronic device 1. For example, the embodiments described above may be implemented as a method for controlling the electronic device 1 or any device analogous to the electronic device 1. Alternatively, the embodiments described above may be implemented as a program executed by the electronic device 1 or by any device analogous to the electronic device 1.

REFERENCE SIGNS

1 electronic device
10 receiving antenna
20 low noise amplifier (LNA)
30 downconverter
40 analog-to-digital converter (ADC)
50 controller

The invention claimed is:

1. An electronic device, comprising:
    an array antenna comprising a plurality of antenna elements; and
    a controller configured to exercise control to transmit and/or receive a radio wave through the array antenna, wherein
    the controller controls directivity of the array antenna and compensates at least partially for reception sensitivity at a null point in the directivity of the array antenna by using a predetermined antenna element of the array antenna,
    the controller combines an output from the predetermined antenna element with an output obtained by combining outputs from the other antenna elements and then puts out a total output, and
    one of the following:
    the controller comprises a phase adjuster configured to bring the output from the predetermined antenna element in phase with the output obtained by combining the outputs from the other antenna elements, or
    the controller selects, from among the outputs from the plurality of antenna elements, an output from an antenna element where a signal level is higher than in the other antenna elements and regards the selected output as the output from the predetermined antenna element.

2. The electronic device according to claim 1, wherein the controller comprises the phase adjuster configured to bring the output from the predetermined antenna element in phase with the output obtained by combining the outputs from the other antenna elements.

3. The electronic device according to claim 2, wherein the output from the predetermined antenna element is multiplied by a predetermined coefficient and is then subjected to phase adjustment in which the controller brings the multiplied output in phase with the output obtained by combining the outputs from the other antenna elements.

4. The electronic device according to claim 1, wherein the controller selects, from among the outputs from the plurality of antenna elements, the output from the antenna element where the signal level is higher than in the other antenna elements and regards the selected output as the output from the predetermined antenna element.

5. The electronic device according to claim 1, wherein the controller selects the output from the predetermined antenna element by switching paths for outputs from the plurality of antenna elements.

6. The electronic device according to claim 1, wherein the controller assigns weights to the plurality of antenna elements, based on an output obtained by combining outputs from the plurality of antenna elements.

7. The electronic device according to claim 1, wherein the controller compensates at least partially for reception sensitivity at a specified null point in the directivity of the array antenna.

8. The electronic device according to claim 1, wherein the electronic device receives a radio wave through the array antenna.

9. The electronic device according to claim 1, wherein the plurality of antenna elements are nondirectional.

10. A method for controlling an electronic device comprising an antenna array comprising a plurality of antenna elements, the method comprising:
    exercising control to transmit and/or receive a radio wave through the array antenna;
    controlling directivity of the array antenna and compensating at least partially for reception sensitivity at a null point in the directivity of the array antenna by using a predetermined antenna element of the array antenna;
    combining an output from the predetermined antenna element with an output obtained by combining outputs from the other antenna elements and then puts out a total output; and
    one of the following:
    bringing the output from the predetermined antenna element in phase with the output obtained by combining the outputs from the other antenna elements, or
    selecting, from among the outputs from the plurality of antenna elements, an output from an antenna element where a signal level is higher than in the other antenna elements and regards the selected output as the output from the predetermined antenna element.

11. The method according to claim 10, comprising:
    the bringing the output from the predetermined antenna element in phase with the output obtained by combining the outputs from the other antenna elements.

12. The method according to claim 10, comprising:
    the selecting, from among the outputs from the plurality of antenna elements, the output from the antenna element where the signal level is higher than in the other antenna elements and regards the selected output as the output from the predetermined antenna element.

13. A non-transitory computer-readable recording medium storing computer program instructions, which when executed by a computer configured to control an electronic device comprising an antenna array comprising a plurality of antenna elements, cause the computer
    to exercise control to transmit and/or receive a radio wave through the array antenna,
    to control directivity of the array antenna and to compensate at least partially for reception sensitivity at a null point in the directivity of the array antenna by using a predetermined antenna element of the array antenna,
    to combine an output from the predetermined antenna element with an output obtained by combining outputs from the other antenna elements and then puts out a total output; and
    one of the following:
    to bring the output from the predetermined antenna element in phase with the output obtained by combining the outputs from the other antenna elements, or
    to select, from among the outputs from the plurality of antenna elements, an output from an antenna element where a signal level is higher than in the other antenna elements and regards the selected output as the output from the predetermined antenna element.

14. The non-transitory computer-readable recording medium storing computer program instructions according to claim 13, wherein the computer program instructions cause the computer to bring the output from the predetermined antenna element in phase with the output obtained by combining the outputs from the other antenna elements.

15. The non-transitory computer-readable recording medium storing computer program instructions according to claim 13, wherein the computer program instructions cause the computer to select, from among the outputs from the plurality of antenna elements, the output from the antenna element where the signal level is higher than in the other antenna elements and regards the selected output as the output from the predetermined antenna element.

* * * * *